US006452130B1

(12) United States Patent
Qian et al.

(10) Patent No.: US 6,452,130 B1
(45) Date of Patent: Sep. 17, 2002

(54) ELECTRODE WITH BRAZED SEPARATOR AND METHOD OF MAKING SAME

(75) Inventors: Ding Qian, Clemson; Tommie Zack Turner, Darlington; Rue Allen Lynch, Florence, all of SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 09/835,698

(22) Filed: Apr. 16, 2001

Related U.S. Application Data

(63) Continuation of application No. 09/694,962, filed on Oct. 24, 2000.

(51) Int. Cl.[7] ................................................ B23K 10/00
(52) U.S. Cl. .............. 219/121.52; 219/119; 219/121.49
(58) Field of Search ........................ 219/121.52, 121.48, 219/121.49, 74, 75, 119

(56) References Cited

U.S. PATENT DOCUMENTS

| | | | | |
|---|---|---|---|---|
| 5,023,425 A | * | 6/1991 | Severance, Jr. | 219/121.52 |
| 5,097,111 A | | 3/1992 | Severance, Jr. | |
| 5,200,594 A | | 4/1993 | Okada et al. | |
| 5,451,739 A | | 9/1995 | Nemchinsky et al. | |
| 5,628,924 A | | 5/1997 | Yoshimitsu et al. | |
| 5,676,864 A | | 10/1997 | Walters | |
| 5,767,478 A | | 6/1998 | Walters | |
| 5,857,888 A | | 1/1999 | Tada et al. | |
| 5,908,567 A | | 6/1999 | Sakuragi et al. | |
| 5,951,888 A | | 9/1999 | Oakley | |
| 6,020,572 A | | 2/2000 | Marner et al. | |
| 6,114,650 A | * | 9/2000 | Marner et al. | 219/121.52 |
| 6,268,583 B1 | * | 7/2001 | Yamaguchi et al. | 219/121.52 |

FOREIGN PATENT DOCUMENTS

JP 60-247491 A 12/1985

OTHER PUBLICATIONS

Cross–sectional view of an Electrode.
Osamu Taguchi, Yoshiaki Iijima; Reaction diffusion in the silver–hafnium system; Journal of Alloys and Compounds 226 (1995) 185–189; Sendai, Japan.

* cited by examiner

*Primary Examiner*—Mark Paschall
(74) *Attorney, Agent, or Firm*—Alston & Bird LLP

(57) ABSTRACT

An electrode for a plasma arc torch and method of fabricating the same are disclosed, and wherein the electrode comprises a copper holder defining two coaxial cavities. An emissive element is secured to one of the cavities and serves as the cathode terminal for the arc during operation. A relatively non-emissive separator is disposed about the emissive element within the other cavity, and acts to separate the copper holder and the emissive element, as well as resisting detachment of the arc from the emissive element and attachment to the copper holder.

32 Claims, 5 Drawing Sheets

ELECTRODE WITH BRAZED SEPARATOR AND METHOD OF MAKING SAME

CROSS-REFERENCE TO RELATED APPLICATIONS

This application is a continuation of U.S. application Ser. No. 09/694,962, filed Oct. 24, 2000 pending, which is hereby incorporated herein in its entirety by reference.

FIELD OF THE INVENTION

The present invention relates to plasma arc torches and, more particularly, to an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelope the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein which supports the arc. The element is composed of a material which has a relatively low work function, which is defined in the art as the potential step, measured in electron volts (ev), which permits thermionic emission from the surface of a metal at a given temperature. In view of its low work function, the element is thus capable of readily emitting electrons when an electrical potential is applied thereto. Commonly used emissive materials include hafnium, zirconium, tungsten, and their alloys. The emissive element is typically surrounded by a relatively non-emissive separator, which acts to prevent the arc from migrating from the emissive element to the copper holder.

A problem associated with torches of the type described above is the short service life of the electrode, particularly when the torch is used with an oxidizing gas, such as oxygen or air. More particularly, the gas tends to rapidly oxidize the copper of the electrode that surrounds the emissive element, and as the copper oxidizes, its work function decreases. As a result, a point is reached at which the oxidized copper surrounding the emissive element begins to support the arc, rather than the element. When this happens, the copper oxide and the supporting copper melt, resulting in early destruction and failure of the electrode.

The assignee of the present application has previously developed an electrode with significantly improved service life, as described in U.S. Pat. No. 5,023,425, the entire disclosure of which is hereby incorporated by reference, and a method for making such an electrode, as described in U.S. Pat. No. 5,097,111, the entire disclosure of which is hereby incorporated by reference. The '425 patent discloses an electrode comprising a metallic tubular holder supporting an emissive element at a front end thereof, and having a relatively non-emissive separator or sleeve surrounding the emissive element and interposed between the emissive element and the metallic holder. The sleeve thereby separates the emissive element from the holder. The '425 patent describes the sleeve as preferably being composed of silver, which has a high resistance to formation of an oxide. The silver and any oxide thereof which does form are poor emitters, and thus the arc will continue to emit from the emissive element rather than from the sleeve or the metallic holder. Service life is thereby significantly extended.

The '111 patent discloses a method for making an electrode which includes the step of forming a single cavity in the front face of a cylindrical blank of copper or copper alloy, the cavity including an annular outer end portion for receiving a non-emissive member. In particular, a metal blank of relatively non-emissive material, preferably silver, is formed to substantially fit within the cavity. The non-emissive blank is then metallurgically bonded into the cavity by first inserting a disk of silver brazing material into the cavity, then inserting the non-emissive blank. The assembly is then heated to a temperature only sufficient to melt the brazing material, and during the heating process the non-emissive blank is pressed into the cavity, which causes the brazing material to flow upwardly and cover the entirety of the interface between the non-emissive blank and the cavity. The assembly is then cooled, resulting in the brazing material metallurgically bonding the element into the non-emissive blank. Next, the non-emissive blank is axially drilled and a cylindrical emissive element is force-fitted into the resulting opening. To complete fabrication of the electrode, the front face of the assembly is machined to provide a smooth outer surface, which includes a circular outer end face of the emissive element, a surrounding annular ring of the non-emissive blank, and an outer ring of the metal of the holder.

In addition, the torches described by the '425 and '111 patents define a rear cavity that extends forwardly towards the front end of the holder such that the emissive element, non-emissive separator, and a portion of the metallic holder form a cylindrical post extending into the rear cavity. A cooling medium, such as water, is circulated in the rear cavity and about the cylindrical post so that heat is transferred from the arc to the cooling water and out of the torch. More specifically, heat is transferred from the arc through the emissive element, non-emissive separator, the copper holder, and any layers of brazing material therebetween to the cooling water. Although this design allows greater heat transfer compared to having no rear cavity, several materials and material interfaces must be crossed, which decreases efficiency.

One particular design defines a rear cavity wherein the cylindrical post includes no portion of the copper holder so that the silver separator is exposed directly to the rear cavity and cooling water circulated therein. For example, FIG. 10 shown in both the '425 and '111 patents discloses a plasma arc torch wherein the holder 16b has a through bore in the lower wall, and the non-emissive insert 32b extends through the bore and is exposed so as to directly contact the cooling water in the rear cavity of the holder. This design is advantageous for two reasons: first, silver has a greater thermal conductivity than copper, which increases the heat transfer between the arc and the cooling water; second, the interface between the silver separator and the copper holder is eliminated, which further improves heat transfer. However, the torch shown in FIG. 10 of the '425 and '111 patents is not easily formed in that, in addition to the rear cavity being formed in the holder, the lower wall of the holder is bored out and the non-emissive separator is press fit therein.

Thus, while both the electrode described in the '425 patent and the method of making an electrode described by the '111 patent provide substantial advances in the art, further improvements are desired. In particular, one method described by the '425 and '111 patents provides boring or drilling out a portion of the non-emissive blank, which is typically silver, along a central axis so that the emissive element or insert can be press-fitted therein. While providing a close-fitting relationship between the emissive element and the non-emissive separator, this method disadvantageously results in a loss of silver drilled from the separator to accommodate the emissive element.

Another method used in forming conventional torches provides securing the emissive element in the non-emissive blank or separator by way of brazing. According to this method, the temperature of the silver alloy brazing material must be above its melting point, and thus the temperature of the silver or silver alloy separator is raised almost to its melting point, which can soften the separator material. If this approach were tried in connection with the embodiment of FIG. 10 of the '425 patent or '111 patent, however, the softened silver separator may be unable to adequately radially restrain the emissive element when inserted into the silver separator, which could result in the emissive element being "off-center" relative to the central longitudinal axis of the electrode.

SUMMARY OF THE INVENTION

The present invention was developed to improve upon conventional electrodes and methods of making electrodes, and more particularly electrodes and methods of making electrodes disclosed in the above-referenced '425 and '111 patents. It has been discovered that the difficulties of the electrodes described above, namely the loss of silver from the relatively non-emissive separator and the positioning of the emissive element along the central longitudinal axis of the electrode, can be overcome by positioning the emissive element in the metallic holder before the separator is installed. In one advantageous embodiment, the present invention provides an electrode and method of making an electrode having an emissive element and a generally non-emissive separator disposed in a front cavity defined by the metallic holder, whereby a brazing material is disposed therebetween such that the emissive element's position along the central longitudinal axis is not affected by the brazing process. In another embodiment, the present invention provides an electrode and method for making an electrode wherein the metallic holder also defines a rear cavity that is sized so that a portion of the separator is exposed to the rear cavity, which thereby improves heat transfer between an arc and a cooling fluid circulated in the rear cavity.

More particularly, in accordance with one preferred embodiment of the invention, an electrode for supporting an arc in a plasma arc torch comprises a metallic holder having a front end and rear end, the front end defining a front cavity. A generally non-emissive separator is positioned in the front cavity and includes an inner peripheral wall. An emissive element is also positioned in the front cavity and includes an outer peripheral wall that is only partially surrounded by the inner peripheral wall of the separator. According to one embodiment, part of the brazing material is disposed between the emissive element and the separator, and also between the separator and the metallic holder. The brazing layer has a melting temperature no greater than the melting temperature of the separator. Thus, the separator and emissive element are metallurgically bonded together such that separator totally separates the emissive element from contact with the outer surface of the metallic holder.

The separator which surrounds the emissive element is preferably composed of a metallic material, such as silver, which has a high resistance to the formation of an oxide. This serves to increase the service life of the electrode, since the silver and any oxide which does form are very poor emitters. As a result, the arc will continue to emit from the emissive element, rather than from the metallic holder or the separator, which increases the service life of the electrode.

In one embodiment, the rear end of the metallic holder defines a rear cavity that extends towards the front end of the holder to expose the separator. The rear cavity can be formed by trepanning or other types of machining, and the exposed separator provides an improved medium for heat transfer from the arc to the cavity, particularly if a cooling medium, such as water, is circulated in the cavity while the torch is in operation.

The present invention also includes a method fabricating the above-described electrode which comprises the steps of forming a front cavity in a generally planar front face of a metallic blank and fixedly securing an emissive element in the front cavity. A relatively non-emissive separator is then positioned in the front cavity of the metallic holder such that the separator is interposed between and separates the metallic holder from the emissive element at the front face of the holder. In one embodiment, the separator has a tubular shape and sized such that the separator and the emissive element have a close-fitting relationship. In addition, the emissive element and separator can be brazed together using a brazing material, such as silver.

Preferably, the front face of the metallic holder is then finished to form a substantially planar surface which includes the metallic holder, the emissive element, and the separator. In one embodiment, a rear cavity is formed in the rear face of the metallic holder such that the separator is exposed to the cavity. In this regard, the metallic holder is trepanned or machined to remove a portion of the holder to thereby expose the separator, which improves the heat transfer from the arc to the cavity. Water or other cooling medium can be circulated within the cavity to further conduct and remove heat from the electrode.

Thus, the electrode of the present invention provides an electrode and method of making an electrode having improved heat transfer properties over conventional plasma arc torches. By positioning the emissive element in the metallic holder before the separator is installed, the position of the emissive element is not affected by a subsequent brazing process. In addition, by exposing the silver separator by trepanning or machining the rear cavity, the front end of the holder is not required to be bored out and the silver separator press fitted therein.

BRIEF DESCRIPTION OF THE DRAWINGS

Figure 1:
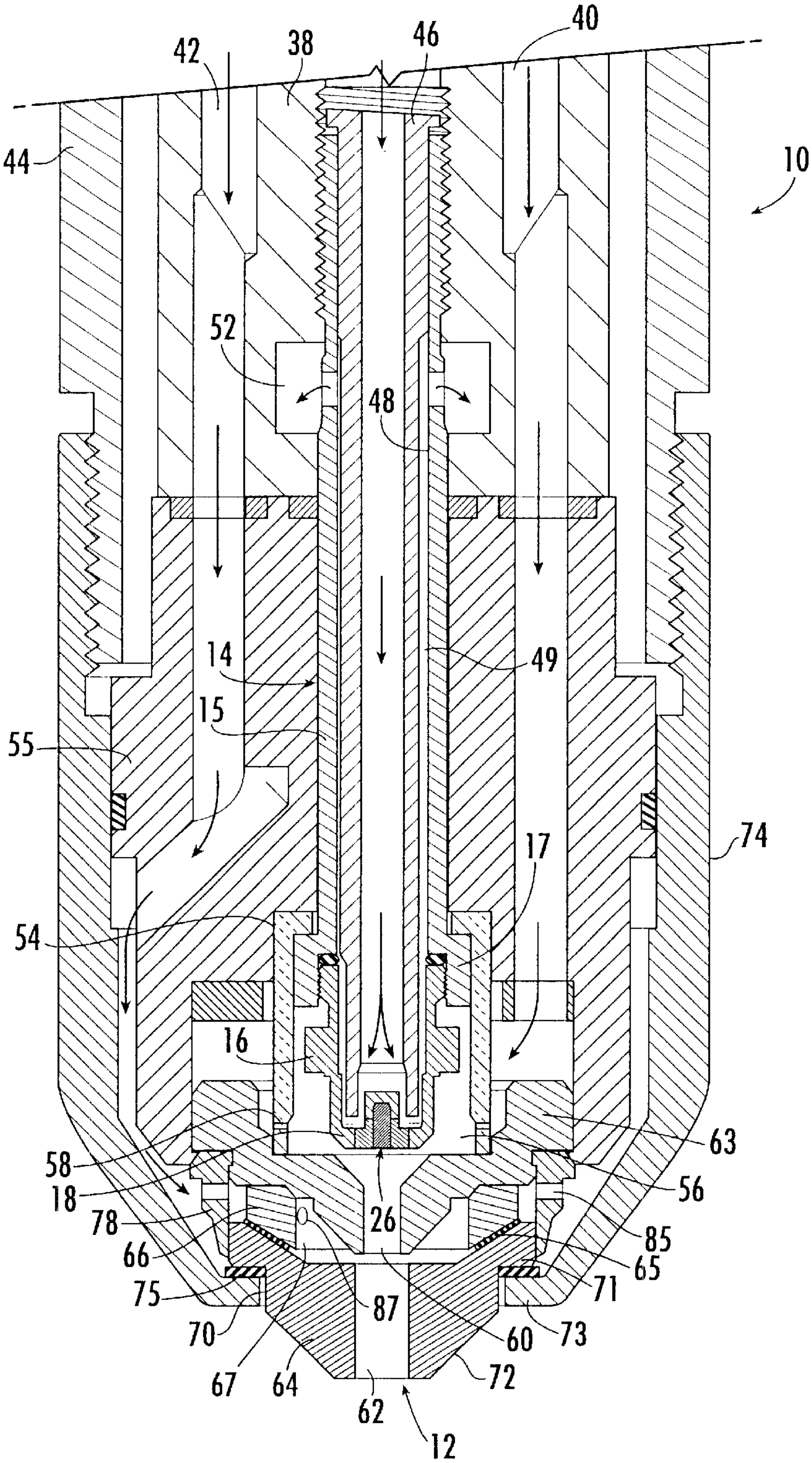
Figure 2:
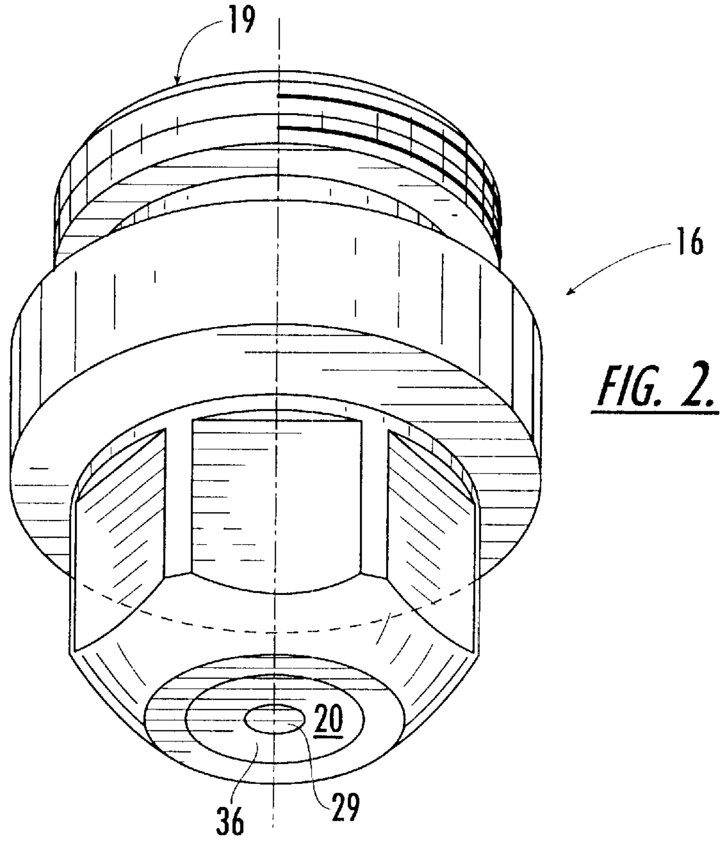
Figure 3:
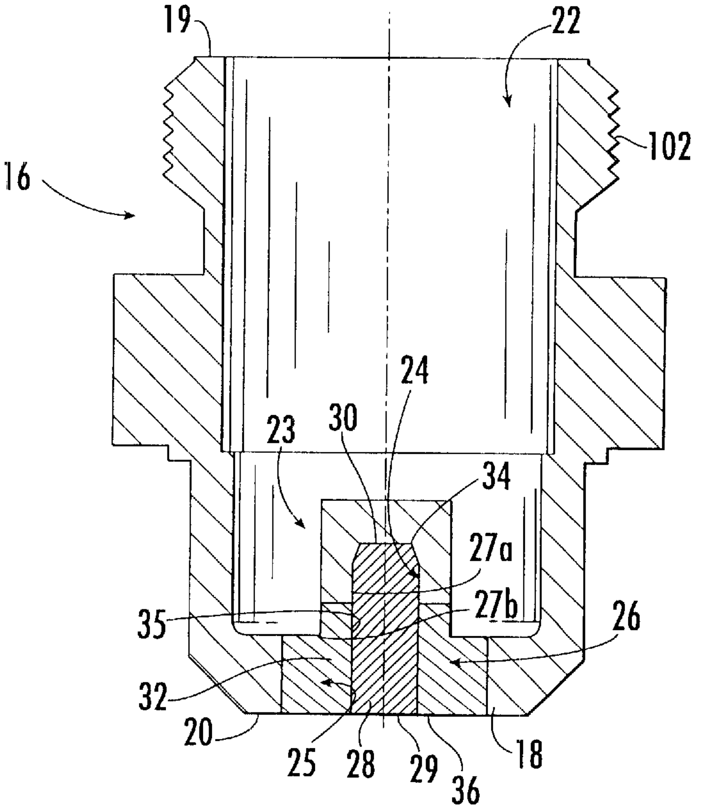
Figure 9:
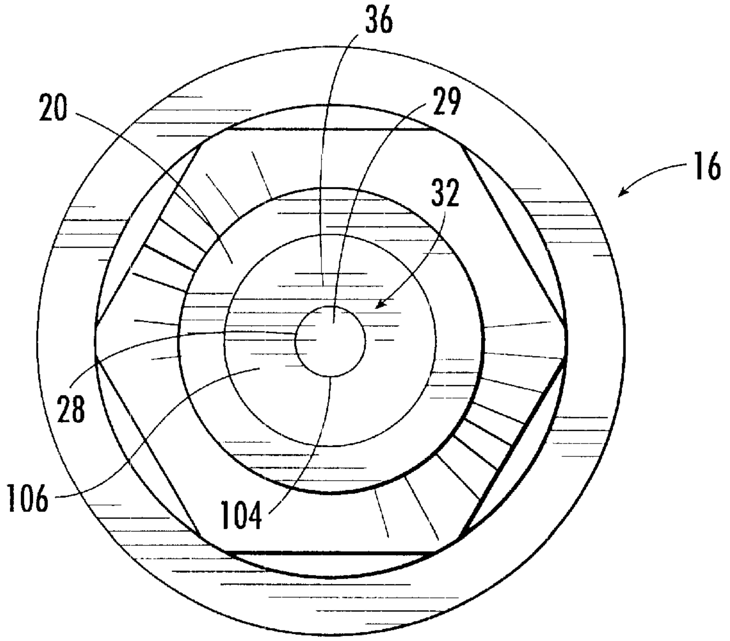

Having thus described the invention in general terms, reference will now be made to the accompanying drawings, which are not necessarily drawn to scale, wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional side view of an electrode in accordance with the present invention;

FIGS. 4–8 are schematic views illustrating the steps of a preferred method of fabricating the electrode in accordance with the invention;

FIG. 9 is an end elevational view of the finished electrode; and

Figure 10:
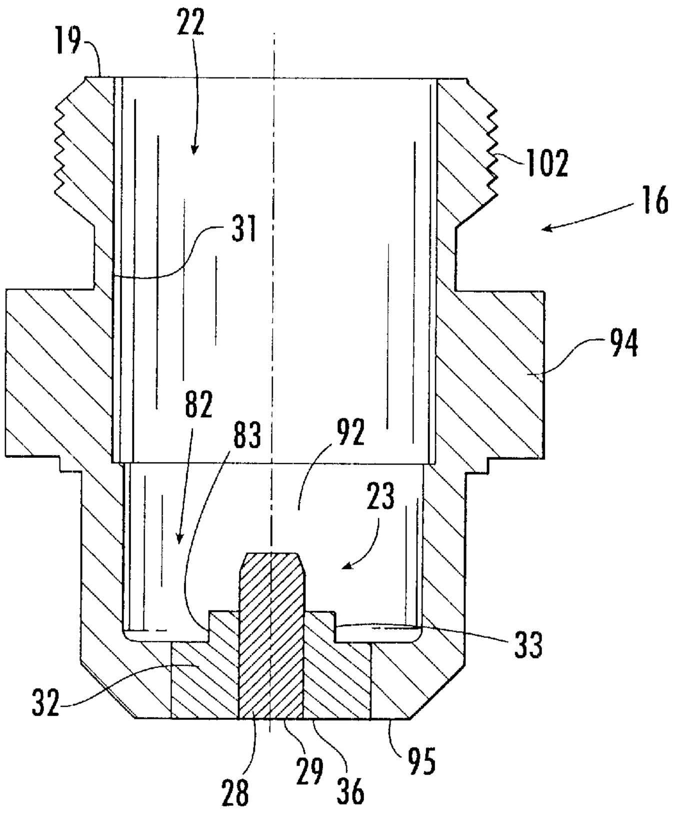

FIG. 10 is an enlarged sectional side view of an electrode according to an alternative embodiment of an electrode in accordance with the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20 (FIG. 2). The rear end of the holder 16 is externally threaded and is threadedly joined to the lower end portion 17 of the upper tubular member 15.

With primary reference to FIGS. 2 and 3, the holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. Advantageously, the cylindrical post 23 is formed to have improved heat transfer properties compared to conventional designs, as discussed below. Two coaxial cavities 24, 25 are formed in the front face 20 of the end wall 18 and extend rearwardly along the longitudinal axis and into a portion of the holder 16. The cavities 24, 25 are generally cylindrical, wherein the first cavity 24 has a diameter less than the second cavity 25. The cavities 24, 25 include inner side surfaces *27a*, *27b*, respectively.

An emissive element or insert 28 is mounted in the small cavity 24 and is disposed coaxially along the longitudinal axis. The emissive element 28 has a circular outer end face 29 lying in the plane of the front face 20 of the holder 16. The emissive element 28 also includes a generally circular inner end face 30 which is disposed in the small cavity 24 and is opposite the outer end face 29. The inner end face 30, however, can have other shapes, such as pointed, polygonal, or spherical, in order to assist in securing the emissive element to the small cavity 24, as discussed below. The emissive element 28 is composed of a metallic material which has a relatively low work function, in a range of about 2.7 to 4.2 ev, so that it is adapted to readily emit electrons upon an electrical potential being applied thereto. Suitable examples of such materials are hafnium, zirconium, tungsten, and alloys thereof. According to one embodiment, the emissive element 28 is secured to the small cavity 24 by an interference fit, although other securing methods can also be used, such as pressing or crimping.

A relatively non-emissive separator 32 is positioned in the large cavity 25 coaxially about the emissive element 28. The separator 32 has a peripheral wall 33 (FIGS. 4–5) extending the length of the emissive element 28. The peripheral wall 33 is illustrated as having a substantially constant outer diameter over the length of the separator, although it will be appreciated that other geometric configurations would be consistent with the scope of the invention, such as frustoconical.

The separator 32 also includes an outer end face 36 which is generally flush with the circular outer end face 29 of the emissive element 28, and is also generally flush with the front face 20 of the holder 16. The separator 32 preferably has a radial thickness of at least about 0.25 mm (0.01 inch) at the outer end face 36 and along its entire length, and preferably the diameter of the emissive insert 28 is about 30–80 percent of the outer diameter of the end face 36 of the separator 32. As a specific example, the emissive element 28 typically has a diameter of about 0.08" and a length of about 0.25", and the outer diameter of the separator 32 is about 0.25".

The separator 32 is composed of a metallic material having a work function that is greater than that of the material of the holder 16, and also greater than that of the material of the emissive element 28. More specifically, it is preferred that the separator be composed of a metallic material having a work function of at least about 4.3 ev. In a preferred embodiment, the separator 32 comprises silver as the primary material, although other metallic materials, such as gold, platinum, rhodium, iridium, palladium, nickel, and alloys thereof, may also be used.

For example, in one particular embodiment of the present invention, the separator 32 is composed of a silver alloy material comprising silver alloyed with about 0.25 to 10 percent of an additional material selected from the group consisting of copper, aluminum, iron, lead, zinc, and alloys thereof. The additional material may be in elemental or oxide form, and thus the term "copper" as used herein is intended to refer to both the elemental form as well as the oxide form, and similarly for the terms "aluminum" and the like.

With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than 30 the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14.

The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 which defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

Method of Fabrication

Figure 4:
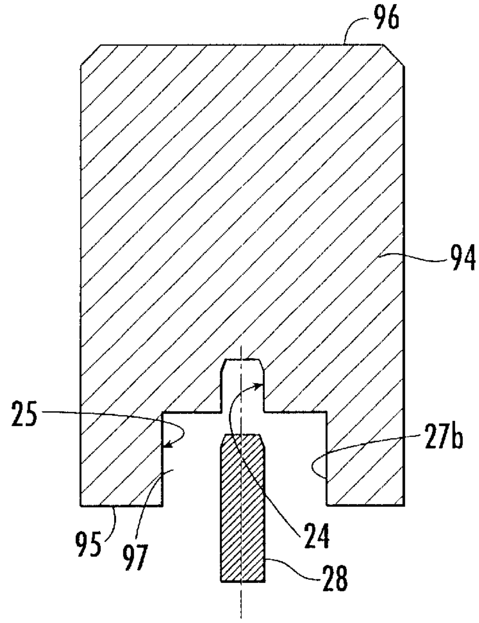

The invention also provides a simplified method for fabricating an electrode of the type described above. FIGS. 4–8 illustrate a preferred method of fabricating the electrode in accordance with the present invention. As shown in FIG. 4, a cylindrical blank 94 of copper or copper alloy is provided having a front face 95 and an opposite rear face 96. A pair of generally cylindrical coaxial bores are then formed, such as by drilling, in the front face 95 so as to form the small cavity 24 and large cavity 25, as described above. The emissive element 28 is then fixedly secured to the small cavity 24 by press-fitting the emissive element therein. Other methods of securing the emissive element into the small cavity 24 can also be used, such as crimping, radially compressing, or utilizing electromagnetic energy. The emissive element 28 extends outwardly from the small cavity 24 towards the front face 95 of the cylindrical blank 94 and defines an open space 97 between the emissive element and inner wall 27*b* of the large cavity 25.

As previously described, a separator 32 is composed of a silver alloy material. In one embodiment, for example, the silver alloy material comprises silver alloyed with about 0.25 to 10 percent of copper. The separator 32 is configured and sized to substantially occupy the open space 97 defined by the inner wall 27*b* of the large cavity 25 and the emissive element 28. In this regard, the separator 32 may be shaped by machining or forming.

Figure 5:
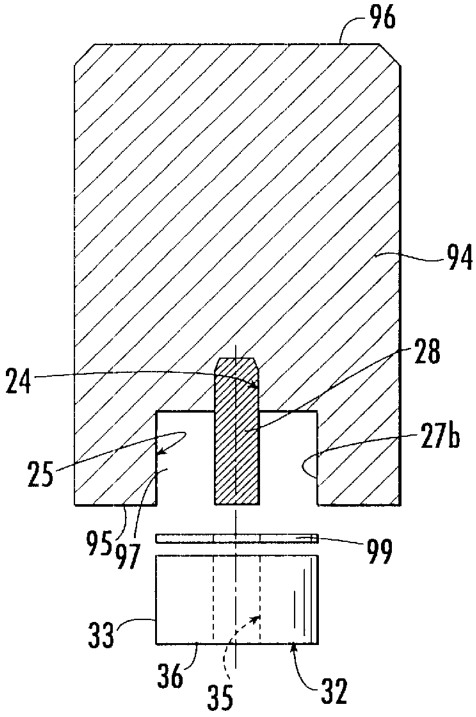

Next, as shown in FIG. 5, the separator 32 is inserted into the large cavity 25 such that the peripheral wall 33 of the separator slideably engages the inner wall 27*b* of the large cavity, and the cylindrical cavity 35 defined by the separator is disposed about the emissive element 28 to define an interface therebetween. In one embodiment, the separator 32 is disposed about the emissive element 28 in a close fitting or interference fit, although other methods of securing the separator to the emissive element can be used, as described below.

Figure 6:
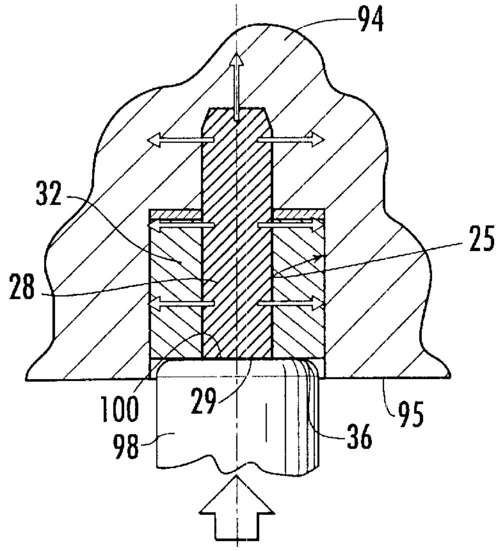
Figure 7:
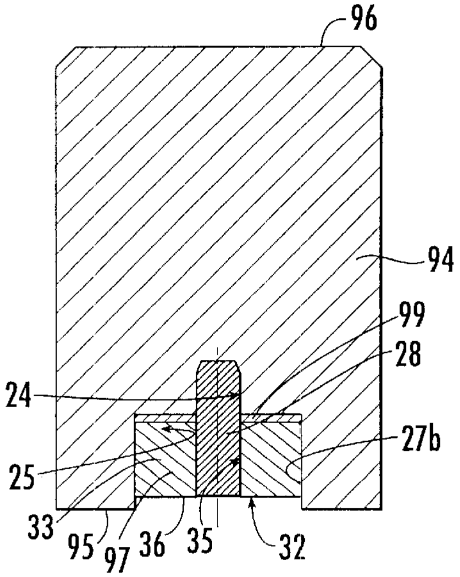

According to one embodiment shown in FIG. 6, a tool 98 having a generally planar circular working surface 100 is placed with the working surface in contact with the end faces 29 and 36 of the emissive element 28 and separator 32, respectively. The outer diameter of the working surface 100 is slightly smaller than the diameter of the large cavity 25 in the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the emissive element 28 and separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the large cavity 25, as shown in FIG. 7.

In a preferred embodiment, the separator 32 is metallurgically bonded to the emissive element 28. Advantageously, the emissive element 28 is already secured to the small cavity 24 when the brazing step is performed (as discussed above) so that the emissive element remains centered along the longitudinal axis even if the separator is softened by the high temperatures associated with brazing. The brazing process is preferably conducted by first inserting a ring 99 (FIGS. 5 and 7) of silver brazing material about the emissive element 28 after the emissive element has been secured to the small cavity 24 such that the ring occupies a portion of the open space 97 between the emissive element and inner wall 27*b* of the large cavity 25. In one example, the brazing material comprises an alloy composed mostly of silver with one or more other elements, such as nickel, lithium, and/or copper. Also, a small amount of flux may be included, so as to remove oxides from the surface of the copper.

The separator 32 is introduced after the ring 99 is inserted into the open space 97, and the resulting assembly is then heated to a temperature only sufficient to melt the brazing material, which has a melting temperature no greater than the separator 32. However, with the present invention, the temperature does not have to be significantly lower than the melting temperature of the separator because the emissive element 28 is secured to the small cavity 24 as described above. During the heating process, the separator 32 is pressed into the large cavity 25, which causes the melted brazing material to flow upwardly and cover the entirety of the interface between the separator and the emissive element 28 and between the peripheral wall 33 of the separator 32 and the inner wall 27*b* of the large cavity 25. Upon cooling, the brazing material provides a relatively thin coating which serves to bond the separator 32 to the emissive element 28, with the coating having a thickness on the order of between about 0.001 to 0.005 inches. Alternatively, the brazing step can be performed by melting a disk of brazing material that is placed on the separator 32 and the emissive element 28 after the two have been pressed into the cavities. In this manner, capillary action pulls the brazing material between the separator 32 and emissive element 28 so that the a relatively thin coating is disposed therebetween as discussed above.

Figure 8:
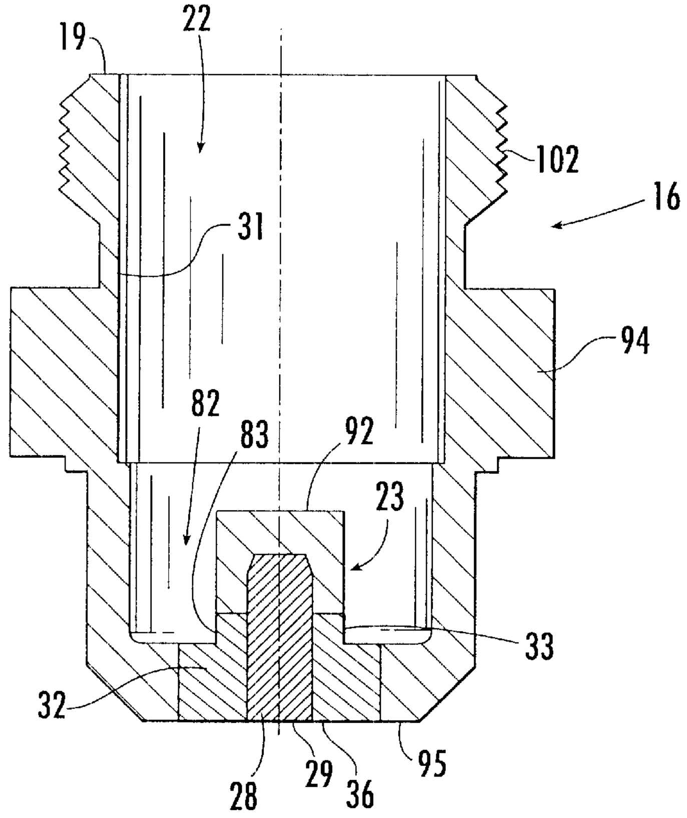

To complete the fabrication of the holder 16, the rear face 96 of the cylindrical blank 94 is machined to form an open cup-shaped configuration shown in FIG. 8 defining the cavity 22 therein. Advantageously, the cavity 22 includes an internal annular recess 82 which defines the cylindrical post 23 and coaxially surrounds portions of the separator 32 and emissive element 28. In particular, the internal annular recess 82 includes an internal surface 83 comprising a portion of the peripheral wall 33 of the separator 32. In other words, the internal annular recess 82 is formed, such as by trepanning or other machining operation, so that a portion of the peripheral wall 33 of the separator 32 is directly exposed to the cavity 22. As such, the exposed separator 32 improves the heat transfer between the cooling medium circulated in the cavity 22 and the arc. Further, the brazing material surrounding the peripheral wall 33 of the separator 32 at the internal surface 83 of the annular recess 82 is preferably eliminated, thus further improving heat transfer.

The improved heat transfer properties mentioned above result from two primary circumstances. First, silver has a greater thermal conductivity than copper, namely 4.29 W/(cm·K) versus 4.01 W/(cm·K), respectively. Second, there are fewer boundaries over which the heat must pass. More specifically, by eliminating the boundary or interface between the separator 32 and the brazing material (as well as the boundary between the brazing material and the blank 94), the rate of heat transfer of the electrode according to the present invention is significantly greater than conventional electrodes. In addition, the path the heat must travel is shorter than conventional electrodes since the separator 32 is directly exposed to the cavity 22.

As discussed above, the surface 31 of the internal cavity 22 includes the cylindrical post 23. In one embodiment shown in FIGS. 3 and 8, the surface 31 includes a cap-shaped portion 92 of the blank 94 disposed about the emissive element 28. The portion 92 is tightly secured to the emissive element 28, although not directly attached to the remainder of the blank 94. Thus, the portion 92 is formed by the trepanning operation for ease of manufacturing, since by leaving the portion 92 the post 23 has a uniform cylindrical shape. However, the portion 92 can also be partially or completely machined away to expose the emissive element 28 to the cavity 22 (see FIG. 10).

The external periphery of the cylindrical blank 94 is also shaped as desired, including formation of external threads 102 at the rear end 19 of the holder 16. Finally, the front face 95 of the blank 94 and the end faces 29 and 36 of the emissive element 28 and separator 32, respectively, are machined so that they are substantially flat and flush with one another. Any brazing material present on the front face 95 and end faces 29 and 36 is also removed during this machining process.

FIG. 9 depicts an end elevational view of the holder 16. It can be seen that the end face 36 of the separator 32 separates the end face 29 of the emissive element 28 from the front face 20 of the holder 16. The end face 36 is annular having an inner perimeter 104 and an outer perimeter 106. Because the separator 32 is composed of the silver alloy material having a higher work function than that of the emissive element 28, the separator 32 serves to discourage the arc from detaching from the emissive element and becoming attached to the holder 16.

Thus, the present invention provides an electrode 14 for use in a plasma arc torch and a method of making an electrode wherein the emissive element 28 is secured along the longitudinal axis and thus prevented from moving while brazing the emissive element to the separator 32. In addition, the separator 32 has a tubular shape, thus eliminating the need for drilling an opening in the separator, which results in a loss of silver.

Many modifications and other embodiments of the invention will come to mind to one skilled in the art to which this invention pertains having the benefit of the teachings presented in the foregoing descriptions and the associated drawings. For example, the separator and or emissive element can have other shapes and configurations, such as conical or rivet-shaped, without departing from the spirit and scope of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating an electrode adapted for supporting an arc in a plasma torch, comprising the steps of:

forming a front cavity in a generally planar front face of a metallic holder, the front cavity extending along an axis generally normal to the front face;

fixedly securing an emissive element to the front cavity of the metallic holder;

positioning a relatively non-emissive separator in the front cavity of the metallic holder such that the separator is interposed between and separates a portion of the metallic holder from the emissive element at the front face of the holder; and forming a rear cavity in the metallic holder such that a portion of the separator is exposed to the rear cavity.

2. A method according to claim 1, wherein the separator is positioned in the front cavity of the holder such that only a portion of the emissive element is in contact with the separator.

3. A method according to claim 1, wherein the emissive element is fixedly secured to the front cavity of the holder by press-fitting.

4. A method according to claim 1, wherein positioning the separator comprises positioning a separator having a tubular shape over the emissive element in a close-fitting relationship.

5. A method according to claim 1, wherein forming the front and rear cavities comprises machining the metallic holder.

6. A method according to claim 1, wherein forming the rear cavity includes exposing the emissive element to the cavity.

7. An electrode adapted for supporting an electric arc in a plasma arc torch, comprising:

a metallic holder having a front end and a rear end, the front end defining a front cavity and the rear end defining a rear cavity;

a generally non-emissive separator positioned in the front cavity, the separator having an outer peripheral wall; and an emissive element also positioned in the front cavity coaxially with the separator, the emissive element having an outer peripheral wall that is only partially in contact with the separator, wherein a portion of the outer peripheral wall of the separator is exposed to the rear cavity.

8. An electrode according to claim 7, wherein the emissive element has a cylindrical shape and the separator has a tubular shape.

9. An electrode according to claim 7, wherein the front cavity comprises a proximal portion and a distal portion, the proximal portion having a diameter smaller than the diameter of the distal portion, wherein the emissive element and the proximal portion of the front cavity have an interference fit therebetween.

10. An electrode according to claim 7, wherein the separator is constructed of silver alloyed with an additional material selected from the group consisting of copper, aluminum, iron, lead, zinc, and alloys thereof.

11. An electrode according to claim 7, wherein a portion of the emissive element is exposed to the rear cavity.

12. A plasma arc torch, comprising:

an electrode which includes:

a metallic holder having a front end and a rear end, the front end defining a front cavity and the rear end defining a rear cavity, a generally non-emissive separator positioned in the front cavity, the separator having an outer peripheral wall that is at least partially exposed to the rear cavity, and an emissive element also positioned in the front cavity coaxially with the separator, the emissive element having an outer peripheral wall that is only partially in contact with the separator;

a nozzle mounted adjacent the front end of the holder and having a flow path therethrough that is aligned with the longitudinal axis;

an electrical supply for creating an arc extending from the emissive element of the electrode through the nozzle flow path and to a workpiece located adjacent the nozzle; and a gas supply for creating a flow of a gas between the electrode and the nozzle and so as to create a plasma flow outwardly through the nozzle flow path and to the workpiece.

13. A plasma arc torch according to claim 12, further comprising a brazing layer disposed between the emissive element and the separator, and between the separator and the second cavity.

14. A plasma arc torch according to claim 12, wherein a portion of the emissive element, the portion being in contact with the first cavity, is substantially free of the brazing material.

15. A plasma arc torch according to claim 12, wherein the separator is constructed of silver alloyed with an additional material selected from the group consisting of copper, aluminum, iron, lead, zinc, and alloys thereof.

16. A plasma arc torch according to claim 12, wherein the emissive element and the separator are flush with the front end of the metallic holder.

17. A plasma arc torch according to claim 12, wherein the metallic holder includes a rear end defining a rear cavity that is at least partially shaped such that the separator is at least partially exposed to the cavity.

18. A plasma arc torch according to claim 17, wherein the metallic holder is at least partially shaped such that the emissive element is at least partially exposed to the cavity.

19. A method of fabricating an electrode adapted for supporting an arc in a plasma torch, comprising the steps of:

forming an opening in a front end of a holder;

securing an emissive element into the opening of the holder such that a portion of the emissive element extends frontwardly from the holder;

securing a relatively non-emissive member about the emissive element in a position such that the non-emissive member and the emissive element will together define at least part of a front face of the electrode for supporting an arc; and forming a cavity in a rear end of the holder such that at least a portion of the non-emissive member is exposed to the cavity and cooling liquid can be circulated therethrough to cool the non-emissive member.

20. A method according to claim 19, wherein the method causes the emissive element to be also at least partially exposed to the cavity.

21. A method of fabricating an electrode adapted for supporting an arc in a liquid cooled plasma torch, comprising the steps of:

providing an emissive element and a relatively non-emissive member defining an opening therein sized to fit around the emissive element;

bonding the non-emissive member to a holder having a front opening therein such that the emissive element extends from the non-emissive member and into the opening of the holder; and forming a rear cavity in the holder such that at least a portion of the non-emissive member is exposed to the rear cavity and cooling liquid can be circulated therethrough to cool the non-emissive member.

22. A method according to claim 21, wherein the method causes the emissive element to be also at least partially exposed to the rear cavity.

23. A method according to claim 21, further comprising removing at least a portion of the non-emissive member to define a front face where the emissive element and the non-emissive member are substantially flat and flush with one another at the front face of the non-emissive member.

24. A method according to claim 21, wherein said bonding step comprises thermally bonding the non-emissive member to the holder.

25. A method according to claim 24, wherein said bonding step comprises brazing the non-emissive member to the holder.

26. A method according to claim 21, wherein said providing step includes providing a metallic holder.

27. An electrode adapted for supporting an arc in a liquid cooled plasma arc torch, comprising:

a holder having a front end and a rear end, the front end defining a front opening and the rear end defining a rear cavity;

an emissive element positioned such that a portion of the emissive element is within the front opening of the holder; and a relatively non-emissive member being secured to said holder and surrounding a portion of the emissive element in a position such that the non-emissive member and the emissive element together define at least part of a front face of the electrode for supporting an arc, wherein a portion of the non-emissive member is exposed to the rear cavity and cooling liquid can be circulated therethrough to cool the non-emissive member.

28. An electrode according to claim 27, wherein at least a portion of the emissive element is also exposed to the rear cavity.

29. An electrode according to claim 27, further comprising a brazing layer disposed between the emissive element and the non-emissive member.

30. An electrode adapted for supporting an arc in a plasma arc torch, comprising:

a holder defining a rear cavity therein, the rear cavity extending along a longitudinal axis defined by the holder;

a relatively non-emissive member secured to the holder and at least partially exposed to the rear cavity defined by the holder, the non-emissive member defining an opening at least partially therethrough;

an emissive element positioned in the opening defined by the non-emissive member such that the emissive element and the non-emissive member together define at least part of a front face of the electrode for supporting an arc; and a brazing material disposed between at least a portion of the emissive element and the relatively non-emissive member.

31. An electrode according to claim 30, wherein the relatively non-emissive member is brazed to the holder.

32. An electrode according to claim 30, wherein the non-emissive member is formed of silver or alloys thereof and the brazing material is formed of silver or alloys thereof, and the non-emissive member and brazing material have melting points that are approximately the same.

* * * * *